United States Patent [19]

Peters

[11] 4,106,189

[45] Aug. 15, 1978

[54] STATOR COIL PRESS

[76] Inventor: Robert W. Peters, 9036 N. 75th St., Milwaukee, Wis. 53233

[21] Appl. No.: 772,764

[22] Filed: Feb. 28, 1977

[51] Int. Cl.² .......................................... H02K 15/06
[52] U.S. Cl. ...................................... 29/736; 29/734; 72/392
[58] Field of Search ................ 29/734, 736, 732, 596; 72/392

[56] References Cited

U.S. PATENT DOCUMENTS

| | | | |
|---|---|---|---|
| 2,506,173 | 5/1950 | Polard | 29/736 |
| 2,873,514 | 2/1959 | Mills | 29/732 |
| 2,980,157 | 4/1961 | Rediger | 29/736 X |
| 4,003,116 | 1/1977 | Bale | 29/734 |

Primary Examiner—Carl E. Hall
Attorney, Agent, or Firm—Ronald E. Barry

[57] ABSTRACT

A stator press including a coil forming device and a coil former, the coil forming device having a plurality of blades arranged to be inserted into the slots of a prewound stator and moved radially outwardly, each blade being independently moved by a separate hydraulic piston and cylinder assembly, the hydraulic piston and cylinder assemblies being connected to a common source of hydraulic fluid for simultaneous movement, the radial movement of the blades seating the coils in the slots of the stator to make room for more coils. The coil forming device being supported on a press which includes a coil former to bend the loops of the coils outwardly away from the opening in the stator.

20 Claims, 11 Drawing Figures

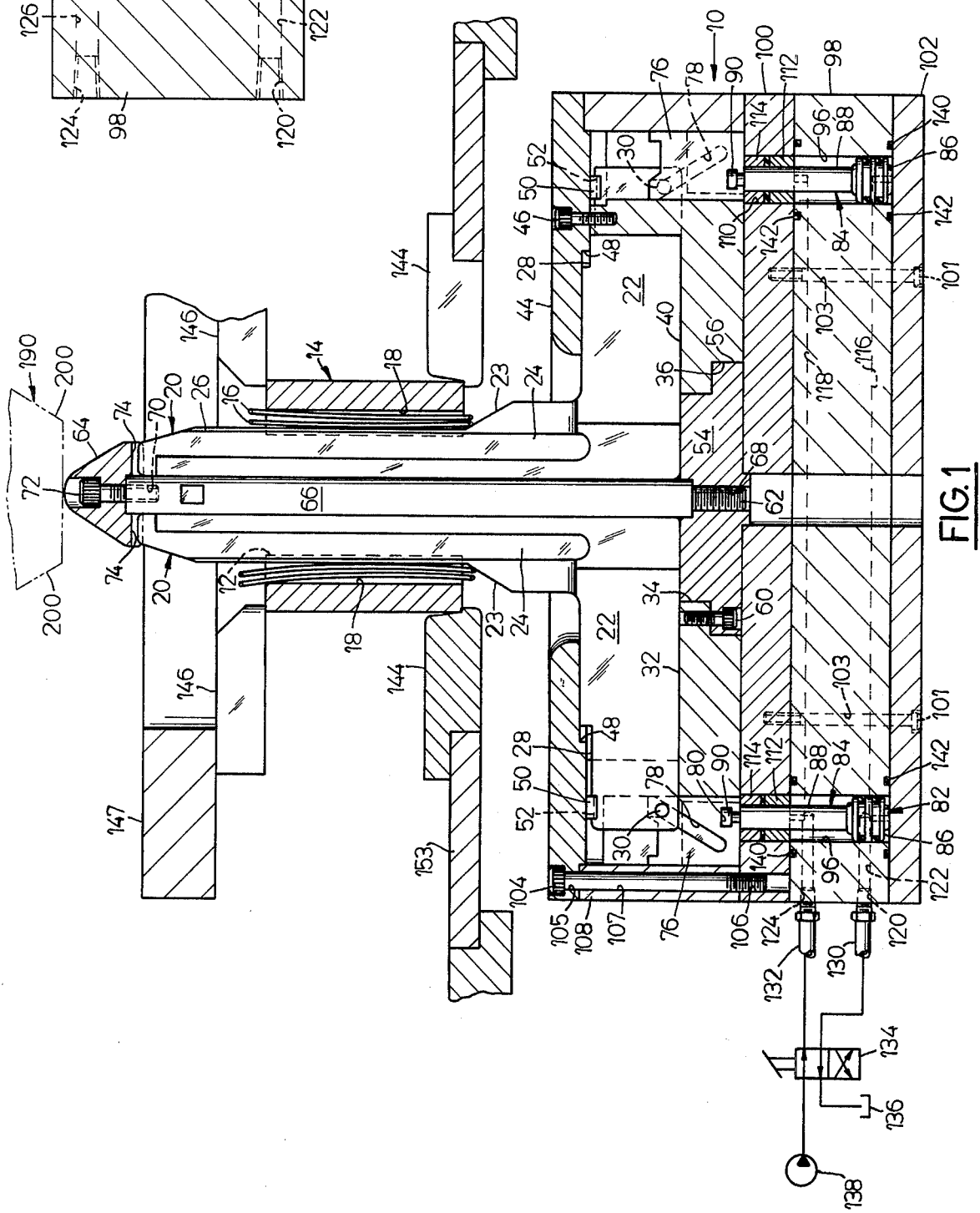

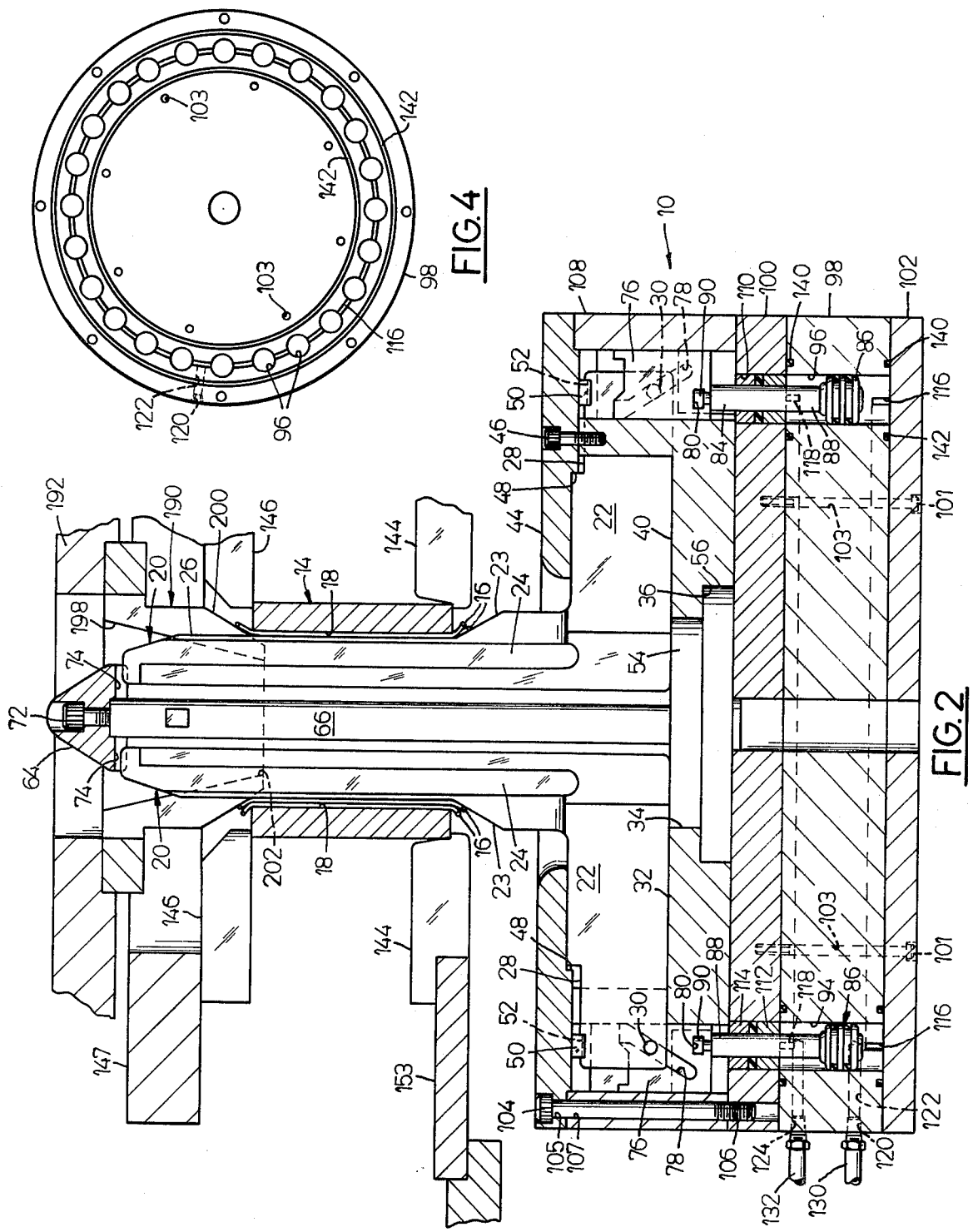

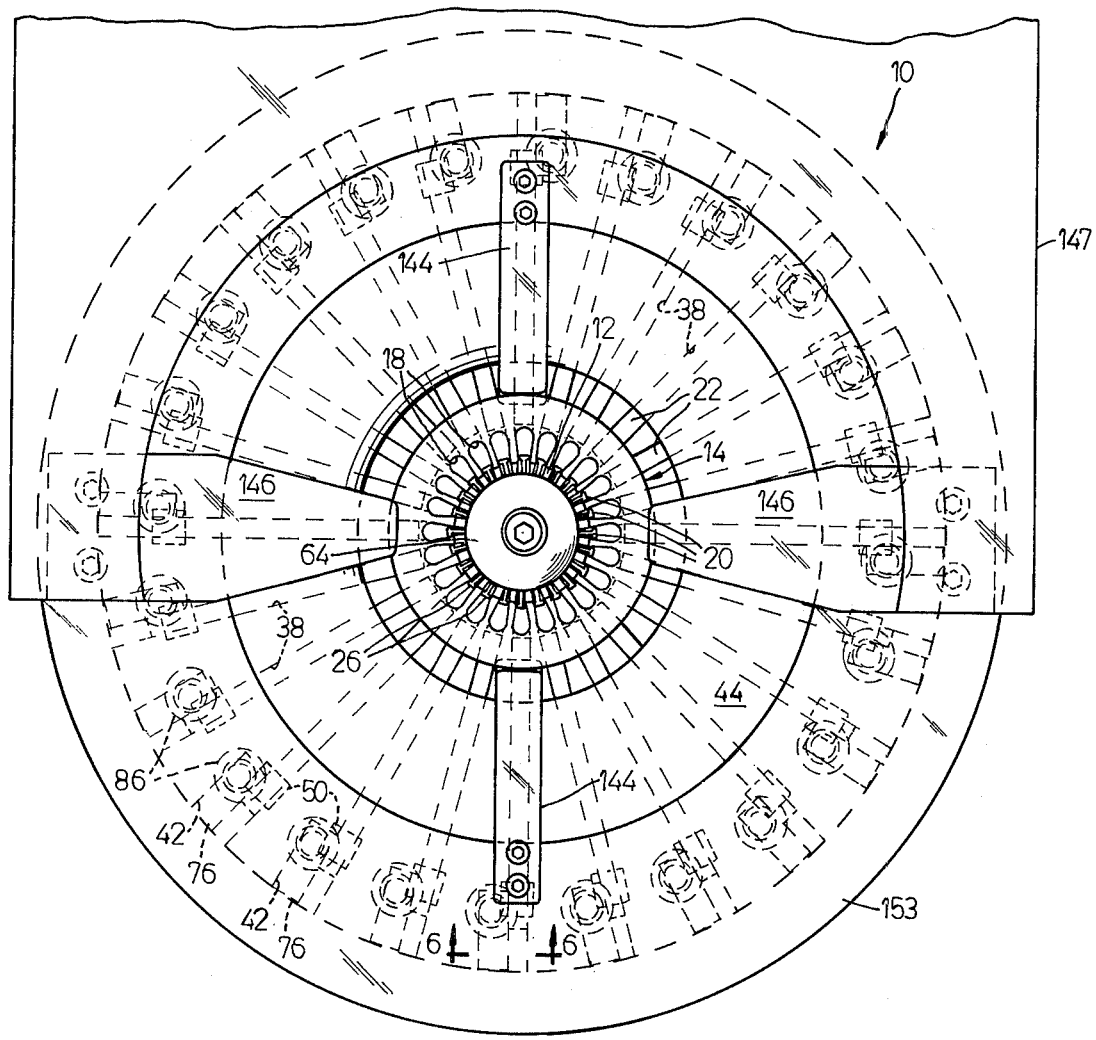
FIG. 5
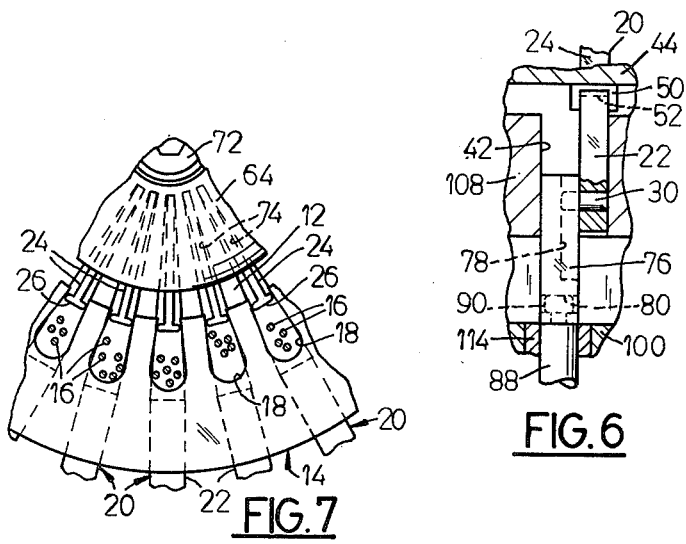
FIG. 6
FIG. 7

STATOR COIL PRESS

BACKGROUND OF THE INVENTION

Stators for electric motors are normally automatically wound with coils in predetermined sequences. After the coils have been wound, the coil windings are generally loosely arranged in the slots and often protrude into the armature opening in the stators. The coils, therefore, must be forced outwardly from the armature opening in the stator to provide proper clearance. This requires considerable force since the coils must be permanently bent so that they will not return to their original position.

SUMMARY OF THE INVENTION

The coil forming device of the present invention provides an automatic means for simultaneously setting all of the coil windings in the stator. This is accomplished by positioning a plurality of blades within the armature opening of the stator with one blade aligned in each of the slots of the stator. The blades are mounted for radial movement outwardly to force the coils into the bottoms of the slots in the stator. Since the number of coil windings in each of the slots varies, the blades are arranged to move radially distances which vary with the number of windings in each slot. In those slots where no coil windings are present, the blade will stop close to the bottom of the slot bending the external portion of any coil winding which overlies the empty slot outwardly from the axis of the stator. A coil former is provided in the press to bend the loops of the coil outwardly to permanently deform the loop of the coil at the outer ends of the slots.

DRAWINGS

FIG. 1 is a side view in section of the coil forming device shown positioned in the armature opening of a stator;

FIG. 2 is a view similar to FIG. 1 showing the coil setting blades moved radially outward into engagement with the coil windings in the slots of the stator;

FIG. 3 is an enlarged view of a portion of the coil forming device showing one of the hydraulic piston and cylinder assemblies;

FIG. 4 is an end view of the piston retainer plate showing the hydraulic circuit for the cylinder;

FIG. 5 is a front view of the coil forming device showing a stator in position for forming the coils;

FIG. 6 is a partial view taken on line 6—6 of FIG. 5 showing the relation of the blade and operating cam plate;

FIG. 7 is an enlarged view of a portion of FIG. 5 showing an end view of one of the slots of the stator with a blade positioned to force the coils outward;

DESCRIPTION OF THE INVENTION

Figure 10:
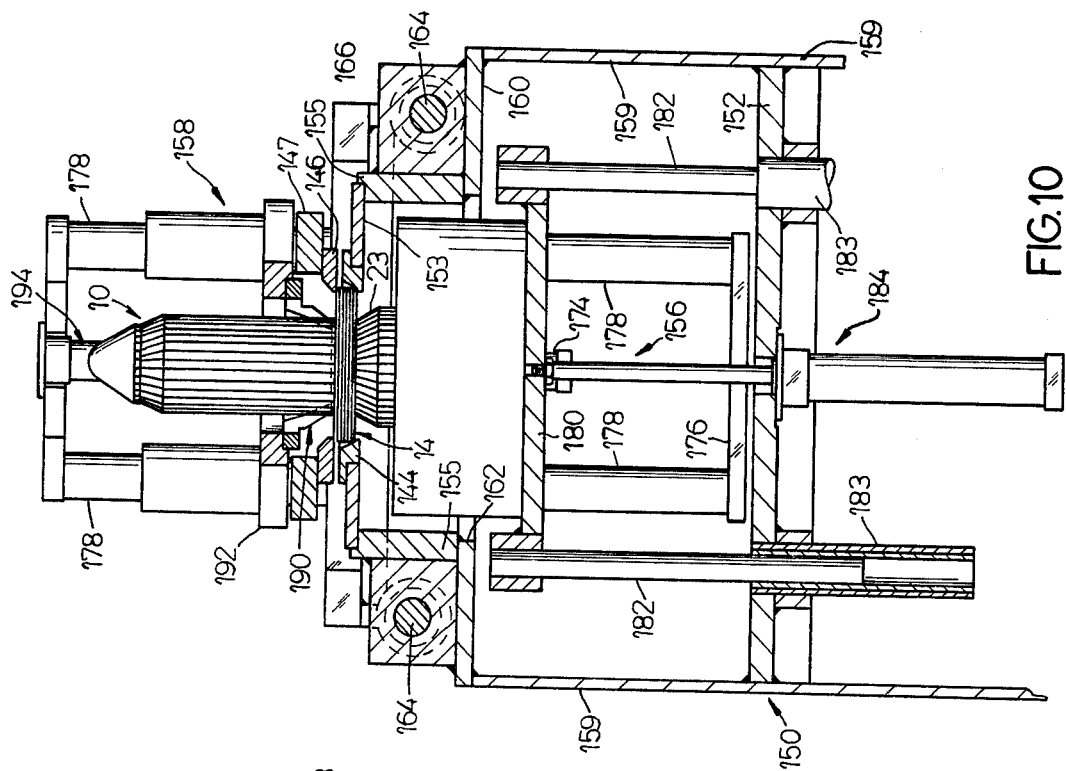
FIG. 10 is an end view partly in section of the coil forming press shown in FIG. 9.
Figure 8:
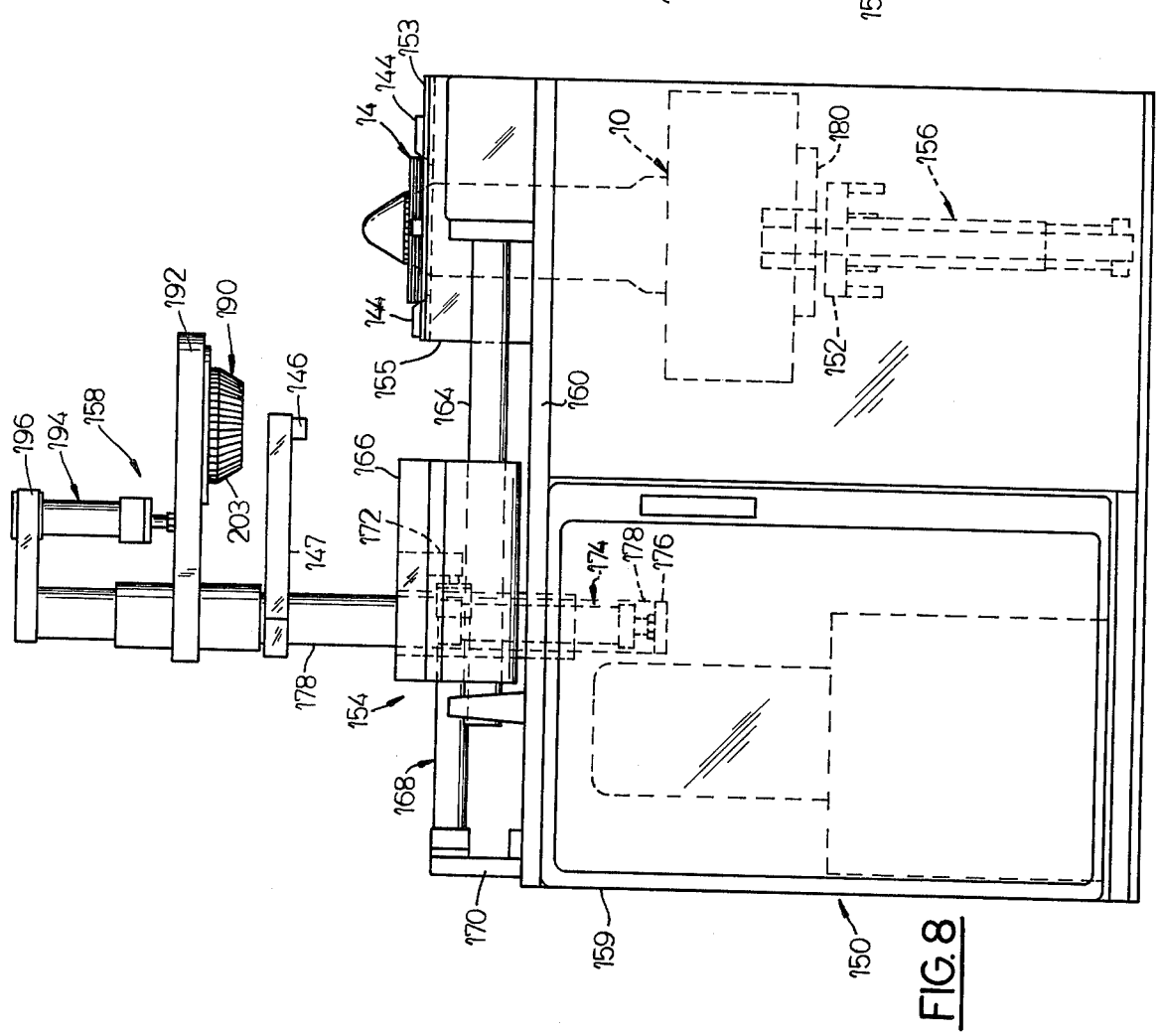
FIG. 8 is a side elevation view of the coil forming press showing the coil forming device in the inoperative position.
Figure 11:
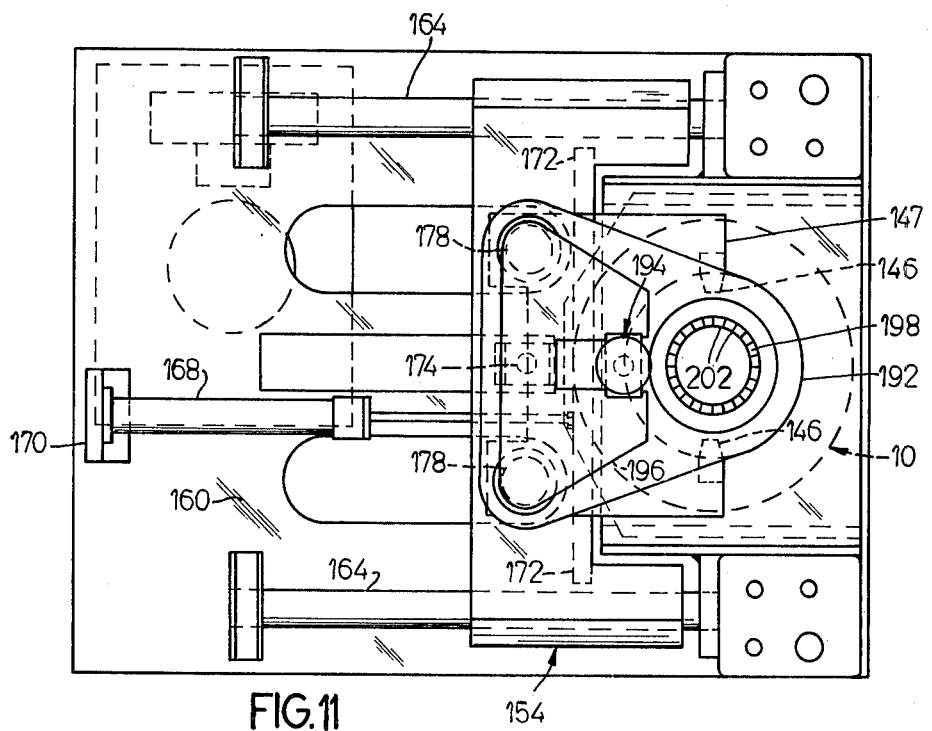
FIG. 11 is a top view of the coil forming press shown in FIG. 9.
Figure 9:
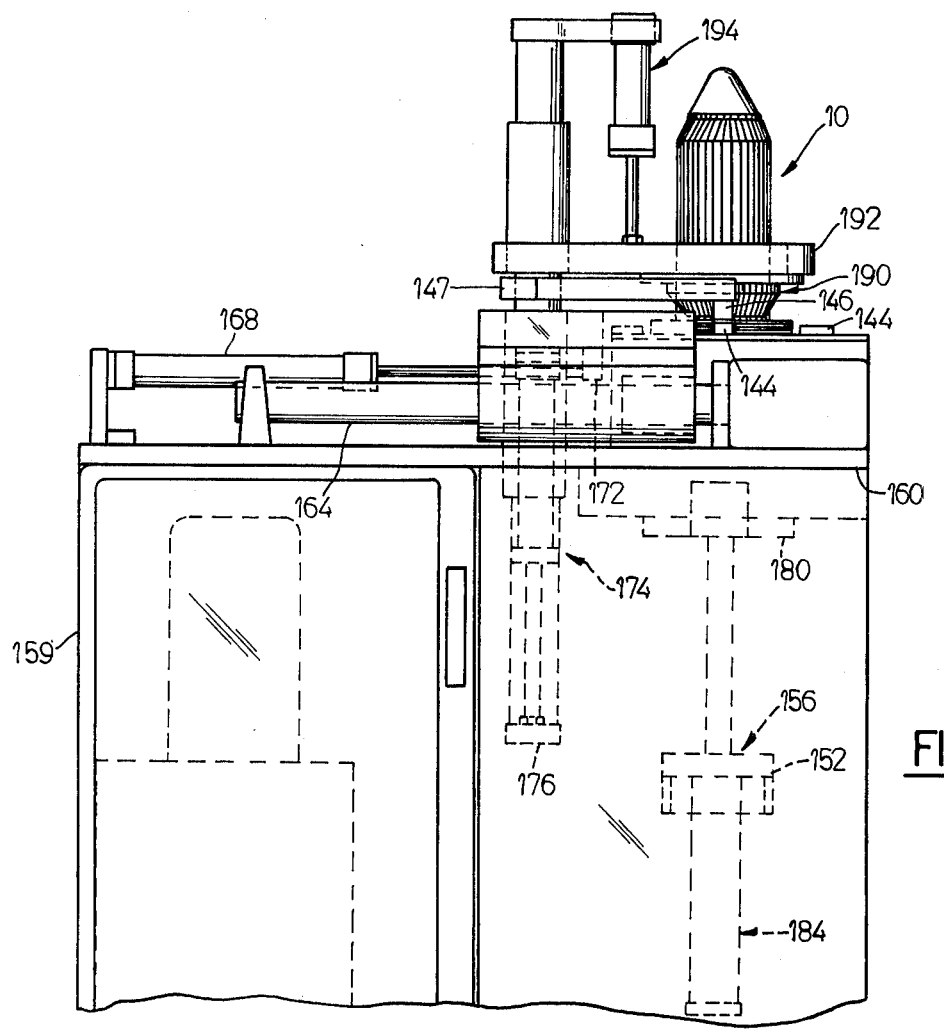
FIG. 9 is a side elevation view of the coil forming press showing the coil forming press in the operative position.

The coil forming device 10 (FIGS. 1-7) is supported in a press 150 (FIGS. 8-11) for movement from an inoperative or retracted position (FIG. 8) to an operative or coil forming position (FIG. 9). The coil forming device 10 is used to seat the coils 16 in the slots 18 of a stator 14. The coils are generally loose after winding and are seated in the slots in order to make room for additional windings. The loops of the coils at the ends of the slots 18 must be moved or bent out of the circle of revolution of the opening 12 in the stator in order to clear the opening for further automatic winding. This is accomplished by means of the coil forming device 190 provided on the press 150 which causes the loops to be forced outwardly from the armature opening with sufficient force to produce a permanent deformation or bending of the loop as seen in FIGS. 1 and 2.

FIGS. 1 AND 2

The coil forming device 10 according to the invention bends the loops of the coils outwardly by means of a plurality of blades 20 which correspond in number to the number of slots 18 in the stator 14. The blades 20 are supported for radial movement outwardly in the slots 18 to permanently bend the loops of the coils outwardly from the stator opening 12. Means are provided for simultaneously moving the blades outwardly variable distances depending on the number of coil windings 16 in each of the slots 18. In this regard, after a stator has been wound each slot 18 may have a different number of windings varying from an empty slot to a full slot. The blades 20 therefore must be capable of moving variable distances to accommodate the number of coil windings.

More specifically, each of the blades 20 includes a base section 22 and a blade section 24 which is located at right angles to the base section 22. The blade section 24 includes a transverse flange 26 (FIG. 7) that acts as a guide in aligning the blade section 24 in the slot 18 of the stator 14. A beveled edge 23 is provided on the inner end of the blade to bend the inner end of the loop of the coil outward. The base section 22 includes a step or notch 28 for limiting the outward movement of the blade 20. A cam follower pin 30 is provided on the outer end of the base section 22.

The blades 20 are supported for radial movement by means of a slide plate 32. In this regard, the slide plate 32 includes a center opening or bore 34 and a recess 36. A plurality of grooves 38 are provided in the surface 40 and extend radially outwardly from the bore 34 of the slide plate 32. A corresponding number of slots 42 are provided in the periphery of the slide plate 32 and are enclosed by an outer ring or cylinder 33. The blade sections 22 are seated in the grooves 38 in the slide plate 32 and are free to slide outwardly in the grooves 38. The blades 20 are retained in the grooves by means of a retainer ring 44 secured to the slide plate 32 by bolts 46. The retainer ring 44 includes an annular step 48 which cooperates with the step 28 on the blade section 22 to limit the outward motion of the blades 20 in the grooves 38.

Means are provided on the blade sections 22 for minimizing wear at the pressure point on the outer end of the blade section 22. Such means is in the form of a U-shaped bearing plate 50 positioned in a notch 52 provided in the blade section 22. The bearing plate 50 will slide on the inside surface of the retainer ring 44.

Means are also provided for minimizing wear at the bearing surface of the blade section 22 with the slide plate 32. Such means is in the form of a wear plate 54 mounted in the bore 34 of the slide plate 32. In this regard, the wear plate 54 includes a flange 56 which is seated in the recess 36. The wear plate 54 is secured to the slide plate by bolts 60. The wear plate 54 is made of a wear resistant metal such as bronze and is provided with a center threaded aperture 62.

The blade sections 24 are stabilized at the outer end by means of a blade retainer 64 mounted on the end of a centerpost 66. The centerpost 66 includes a threaded section 68 which is threadedly received in the threaded aperture 62 in the wear plate. A threaded opening 70 is also provided at the outer end of the centerpost 66. The blade retainer 64 is secured to the centerpost 66 by a bolt 74 and includes a plurality of grooves 74 which correspond to the number of blades 20 provided on the device 10. The ends of the blade sections 24 are positioned in the grooves 74.

The blades 20 are moved radially by means of cam plates 76 provided in the slots 42 in the outer periphery of the slide plate 32 as seen in FIGS. 1, 2 and 6. Each cam plate 76 includes a diagonal cam slot 78 and a notch 80. The cam plate 76 is positioned within the slot 42 with the pin 30 on the base section 22 aligned in the cam slot 78 in the cam plate. Linear movement of the cam plate 76 in the slot 42 will move the blade 20 radially inwardly or outwardly in the grooves 38 in the slide plate 32. The cam plates 76 are enclosed in the slots 42 by means of an outer ring 108 as described hereinafter.

The cams 76 are moved by means of a double-acting hydraulic piston and cylinder assembly 82 mounted on the slide plate 32. In this regard, the piston and cylinder assembly 82 includes a piston 84 having a piston head 86, a piston rod 88 and a connecting head 90. As seen in FIG. 3, a number of grooves 92 are provided in the piston head for O-ring seals 94. The piston 84 is mounted for reciprocal motion in a bore or cylinder 96 provided in a retainer plate 98.

More specifically, the retainer plate 98 includes a plurality of cylinders 96 corresponding in number to the blades 20. The retainer plate 98 is secured to a bushing retainer plate 100 on one side and a base plate 102 on the other side by means of a number of bolts 101 which extend through opening 103. The bushing retainer plate, piston retainer plate and base plate are secured to the slide plate 32 by means of a bolt 104 which passes through an opening 105 in retainer ring 44, an opening 107 in outer ring 33 and is threadedly received in a threaded opening 106 in the bushing retainer plate 100.

The piston rod 88 passes through an opening 110 in the bushing retainer plate 100 and is connected to the cam plate 76 by means of the connecting head 90 which is positioned in the notch 80 in the cam plate 42. The piston rod 88 is sealed in the opening 110 by means of a bushing 112 and an oil seal 114.

Means are provided for actuating all of the cam plates 76 simultaneously so that the blades 20 move outwardly into the slots 18 in the stator at the same time. Such means is in the form of a pair of annular grooves 116 and 118 (FIG. 3) provided on opposite sides of the retainer plate 98. Each of the annular grooves or slots passes through all of the cylinders 96 forming a common fluid connection to all of the cylinders in the retainer plate 98. The groove 116 is connected to a threaded opening 120 in the retainer plate 98 by means of a passage 122.

The groove 118 is connected to a threaded opening 124 in the retainer plate 98 by passages 126.

The openings 120 and 124 are connected through hydraulic lines 130 and 132 to a hydraulic valve 139 (shown schematically) which is connected to a source of fluid under pressure 130 and a reservoir 138. As is understood in the art, movement of the valve in one direction will connect one of the grooves 116, 118 to the source of fluid pressure and the other of the grooves 116, 118 to the reservoir. Movement in the opposite direction will reverse the connection. Assuming fluid under pressure is admitted through opening 120 to groove 116, all of the pistons 84 will be moved simultaneously.

Means are provided for sealing the retainer plate 98 to the bushing plate 100 and the base plate 102. Such means is in the form of a pair of O-rings 140 (FIG. 4) provided in annular grooves 142 in each surface of the retainer plate 98.

With this arrangement of the hydraulic system, each blade 20 will be moved at the same pressure at the same time. Since the slots 18 in the stator may have different numbers of coil windings, the blades will move until the resistance of the deformed or set coils equals the hydraulic pressure force. In those slots 18 where no windings are present, the blade will stop upon engagement of the limit stop notch 28 with step 48. Any coils which lie in the slots 18 will be pushed by the blade 20 outwardly from the center of the stator. It should be understood that normally, the coil windings will span more than one stator slot and the movement of the blade to the end of an empty slot will assure that the loop of the coil winding overlying the slot is moved clear of the armature opening.

In operation, the coil forming device 10 is supported by means of the press 150 in the armature opening 12. In this regard, the opening 12 in the stator 14 is aligned with the blade sections 24 with the transverse flange 26 positioned at the inner end of the slots 18. The stator 14 is then clamped between the stator rest 144 and stator clamp 146. The coil forming device 10 is then pushed into the stator to align the blade sections 24 in the slots 18.

As seen in FIG. 2, hydraulic fluid under pressure is admitted to the annular groove 116. The blades 20 move outwardly to press the coil windings 16 against the bottom of the slots 18 and the surface 23 on blade 20 forms the overhanging coils back against the bottom of the stator. A coil former 190 forms the overhanging coils back against the top as described hereinafter. Hydraulic pressure is released by reversing valve 134 to withdraw the blades 20. The stator can then be removed from the stator rest 144 and stator clamp 146.

FIGS. 8–11

The coil forming press generally includes a base 150 having a stator rest plate 153 mounted thereon for supporting the stator 14, a carriage assembly 154 for supporting the stator clamps 146, a support assembly 156 for supporting the coil forming device 10 for movement into the armature opening 12 of a stator 14. It should be noted that the stator 14 shown in the press is of smaller cross section than the stator shown in FIGS. 1-7; however, the operation of the coil forming device 10 is the same. The loops of the coils 16 are bent outwardly by means of a coil former 190.

The base 150 generally includes sidewalls 159 and a top plate 160 having an opening 162 for the coil forming device 10. The stator rests 144 are supported on the stator rest plate 153 which is mounted on a pair of plates 155 on the top plate 160. The stator clamps 146 are supported on a plate 147 mounted on the carriage assembly 154.

CARRIAGE ASSEMBLY

In this regard, the carriage assembly 154 includes a pair of carriage shafts 164 mounted on the top plate 160 and supporting a carriage 166 for horizontal movement on the top plate 160. The carriage 166 is moved by means of a hydraulic piston and cylinder assembly 168 secured to a bracket 170 on the top plate 160 and to a bar 172 mounted on the carriage 166. The clamp plate 147 is moved vertically relative to the carriage 166 by means of a hydraulic cylinder assembly 174 which is connected to the carriage 166 and to a cross bar 176 on the bottom of a pair of shafts 178. The clamp plate 147 is mounted on the shafts 178 and is moved vertically downward to clamp the stator 14 to the stator rest 144.

The coil forming device 10 is moved upward through the opening in the stator 14 by means of the support assembly 156. In this regard, the support assembly 156 includes a mounting plate 180 supported on a pair of shafts 182. The shafts 182 are supported for vertical motion in a pair of bearings 183 mounted on a cross plate 152 on base 150. The mounting plate 180 is moved upward by means of a piston and cylinder assembly 184 which is secured to the plate 152 and to the mounting plate 180.

The outer loops on the ends of the coils are formed by means of the coil former or ring 190 supported for vertical movement on the carriage assembly 154 by means of a plate 192 mounted on shafts 178. The coil former plate 192 is moved vertically by means of a piston and cylinder assembly 194 supported on a cross bar 196 on the upper end of shafts 178. The coil former 190 has a central opening 198 and a beveled surface 200. The open end of the former is slotted to form fingers 202 that slide along the sides of the bars 24. The beveled surface 203 of the former will bend the loops outward.

The lower end of the loops of the coils are bent outwardly by the beveled edges 23 on the blades 24. This is accomplished by the movement of the coil forming device 10 into the opening in the stator and the expanding of the blades 20 outwardly.

In operation, a stator 14 is placed on the stator rests 144 as seen in FIG. 1. The carriage assembly 154 is moved into alignment with the stator by actuating the hydraulic piston and cylinder assembly 168. The stator clamps 146 are moved down to clamp the stator 14 against the stator rest 144. The coil forming device 10 is moved upward to an operative position in the stator. After the device 10 has moved into the stator, the blades 20 are moved outward to set the coils in the slots 18. The upward movement of the device 10 will bring the beveled edges 23 into engagement with the lower end of the loops of the coils to bend them outward. The coil former 190 is then brought down around the coil forming device 10 to bend the loops outward. The stator 14 is released by reversing the order of actuation of the various assemblies.

U-shaped wedges are often provided in the stator slots after the coils have been wound into the slots. The wedges are inserted into the slots with the legs of the wedges biased outwardly against the walls of the slots. On insertion of the coil forming device 10 through the stator, the blades 20 tend to push the wedges upward in the slots. In order to prevent displacement of the wedges, the blades 20 are activated after the device 10 has been moved partially into the stator to force the wedges outwardly against the coils. The legs of the wedges will be locked or wedged between the coils and the walls of the stator slots. The blades are then retracted and the coil forming device 10 is moved upward to finish the coil forming operation.

The embodiments of the invention in which an exclusive property or privilege is claimed are defined as follows:

1. A stator coil forming device for forming the coils in the slots of a stator, said device comprising:
    a slide plate,
    a plurality of coil setting blades supported for radial movement on said slide plate,
    and means for independently moving each of said blades radially outwardly, at least two of said blades moving different distances, to press the coils into the slots of the stator.

2. The device according to claim 1 wherein said means for moving said blades comprises a plurality of cams, each cam being operatively connected to a corresponding blade and a plurality of hydraulic piston and cylinder assemblies, each piston and cylinder assembly being connected to one of said cams for moving said cams relative to said blades.

3. The device according to claim 2 wherein said cam includes a diagonal slot and said blade includes a cam follower pin positioned in said slot.

4. The device according to claim 2 including means for actuating said assemblies simultaneously.

5. The device according to claim 1 wherein each blade includes means for aligning the blades in the slots of the stator.

6. A device for forcing the coils in the slots of a stator outwardly from the center of the stator, said device including:
    a plurality of blades,
    means for supporting said blades for movement outwardly in the slots of the stator,
    and means for moving said blades independently of each other a distance sufficient to permanently seat the coils in the slots of the stator, at least two of said blades moving different distances.

7. The device according to claim 6 wherein said blades equal the number of slots in the stator.

8. The device according to claim 6 wherein said supporting means comprises a slide plate having a plurality of radial grooves corresponding to the number of said blades, a centerpost mounted on said slide plate and a blade retainer having a corresponding number of grooves, said blades being mounted for movement in said grooves in said slide plate and blade retainer.

9. The device according to claim 6 wherein said means for moving said blades includes a double acting hydraulic piston and cylinder assembly for each blade.

10. The device according to claim 9 including a cam plate operatively connecting each of said piston and cylinder assemblies to a blade.

11. The device according to claim 9 including means for introducing hydraulic fluid under pressure into said piston and cylinder assemblies simultaneously.

12. A device for forming the coils in the slots of a prewound stator, said device comprising:
    a plurality of blades,
    means for supporting said blades for movement into said slots, and a number of cam plates corresponding to the number of blades mounted in said supporting means for moving each of said blades outwardly from the axis of the stator a distance which varies with the number of coils in the corresponding slot of the stator.

13. The device according to claim 12 including means for moving said cams simultaneously.

14. The device according to claim 13 wherein said moving means comprises a plurality of piston and cylinder assemblies corresponding to the number of blades in the device, said assemblies being connected to said cam plates and including means for hydraulically actuating said assemblies simultaneously.

15. The device according to claim 14 wherein said cam plates each include a cam slot and each blade includes a cam follower pin positioned in the path of motion of said cam slot.

16. A stator coil forming device for seating the coils in the slots of a prewound stator, said device comprising:
- a plate having a plurality of radially extending slots corresponding to the number of slots in the stator,
- a blade positioned in each of said slots in the plate, each blade having a base section and a blade section,
- and means for independently moving said blade sections variable distances into the slots in the stator whereby the coils are seated in the slots of the stator, at least two of said blades moving different distances.

17. The device according to claim 16 wherein said moving means includes a cam plate connected to said base sections and double-acting hydraulic piston and cylinder assembly connected to each of said cam plates.

18. A stator coil press for seating and forming coils in the slots of a stator, said press comprising:
- a base,
- means for supporting a stator on said base,
- a coil former,
- means on said base for carrying said coil former from an inoperative position to an operative position in alignment with said stator,
- a coil forming device, said device including a plurality of blades corresponding to the number of slots in the stator, said blades being moveable independently distances sufficient to seat the coils in the slots of the stator,
- means for independently moving each of said blades radially outwardly, at least two of said blades moving different distances, to press the coils into the slots of the stator,
- means on said base for supporting said coil forming device for movement from an inoperative position to an operative position in said stator,
- and means for moving said coil former toward said stator to form the coils on the stator.

19. The press according to claim 18 wherein said carrying means includes a clamp mounted for movement into engagement with the stator to clamp the stator on said supporting means.

20. A stator coil press for forming the coils in the slots of a stator, said press comprising:
- a base,
- a stator rest mounted on said base for supporting the stator,
- a carriage assembly mounted on said base for movement from an inoperative position to an operative position with respect to said stator, said carriage assembly including
- a stator clamp plate mounted for movement into engagement with the stator to clamp the stator on the stator rest,
- and a coil former supported on said carriage for movement into engagement with the loops of the coils at the end of the slots of the stator,
- a coil forming device mounted on said base for movement through said stator and former, said device including a plurality of blades mounted for independent movement through variable distances into the slots of the stator, said coil former having a plurality of fingers corresponding to the slots in the stator for bending the coils outwardly from the center of the stator,
- and means for independently moving each of said blades radially outwardly, at least two of said blades moving different distances, to press the coils into the slots of the stator.

* * * * *